Sept. 21, 1954  R. G. KUPFER  2,689,395
ELASTIC ROLLER AND METHOD OF MANUFACTURING THE SAME
Filed May 16, 1952
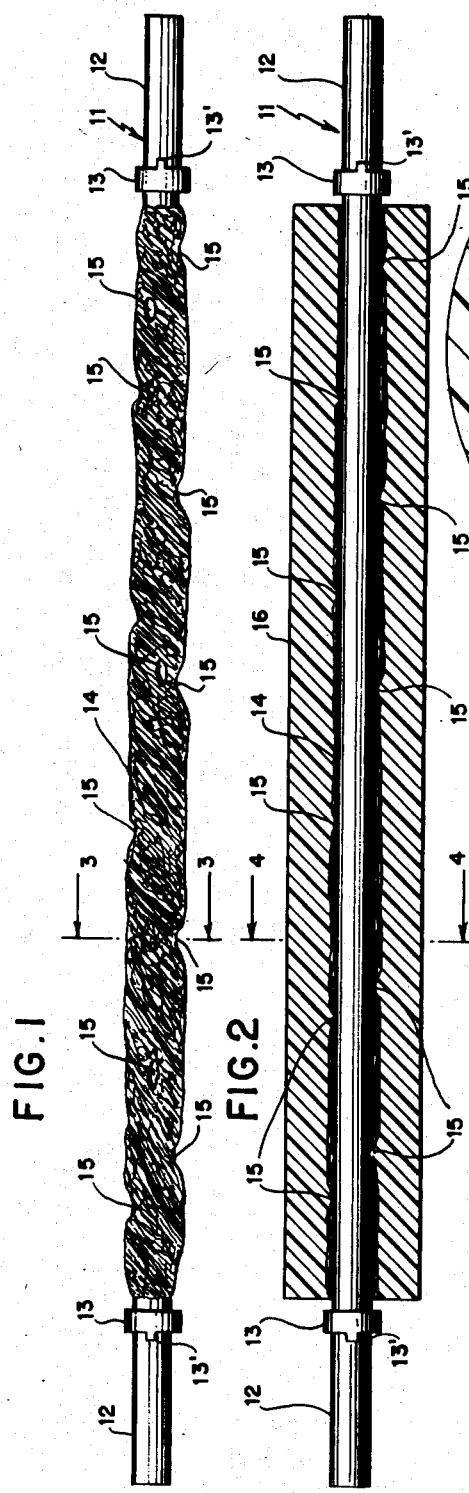
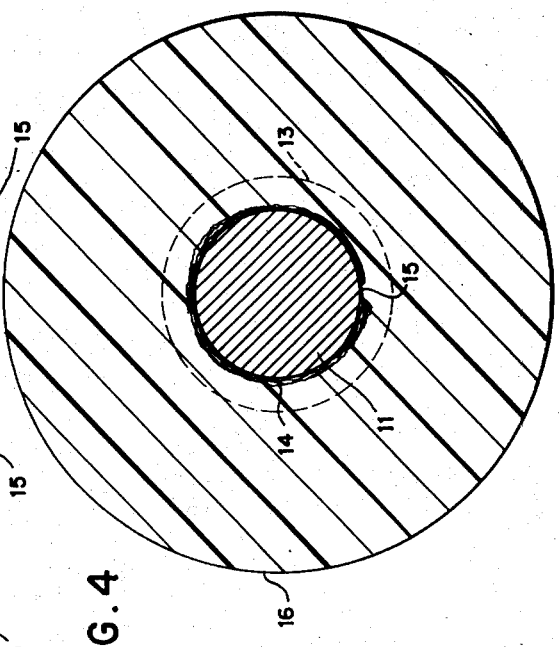
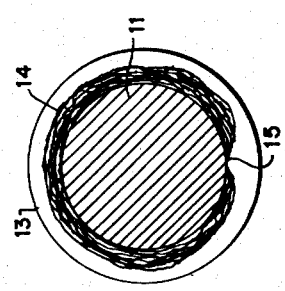
INVENTOR.
Reinhold G. Kupfer
BY
Richardson, David and Nordon
ATTORNEYS Patented Sept. 21, 1954

2,689,395

UNITED STATES PATENT OFFICE 2,689,395

ELASTIC ROLLER AND METHOD OF MANUFACTURING THE SAME

Reinhold G. Kupfer, Brooklyn, N. Y.

Application May 16, 1952, Serial No. 288,164

11 Claims. (Cl. 29—129)

The present invention relates to elastic rollers useful, for instance, as ink rollers for printing presses, and more particularly to rollers of this character comprising a smooth, cylindrical inking surface formed of elastic thermoplastic material and to a method of manufacturing such rollers.

It is presently standard practice to produce ink rollers having a gelatin-glycerine composition roller body which, due to the glue properties of the material used, may be bonded directly to the roller core. Such materials have numerous disadvantages, however, such as lack of dimensional stability, sensitivity to changes in temperature and humidity and gradual hardening.

These difficulties have been partly overcome by the use of rollers formed of rubber vulcanized to the central steel core or shaft. The rubber rollers are subject to gradual hardening. Moreover, the cost of rubber is too great, compared with other materials, to justify its use where such use can be avoided. Another method for avoiding these difficulties would be the use of an elastic, thermoplastic material, such as a suitable polyvinyl compound for the roller body. However, in contrast to rubber, which is a thermosetting material, the thermoplastic compounds are not vulcanizable and, consequently, cannot be adhered to metal by means of vulcanization.

For this reason, up to the present, one of the most serious problems involved in the use of any sufficiently elastic, thermoplastic material has been to produce a suitable bond between the elastic body portion of the roller and the central steel core or shaft.

I produce a strong permanent bond by the use of a helically wrapped layer of a metal wool, such as the steel wool, secured to the core of the roller, the thermoplastic material being applied over the layer of metal wool and penetrating into and filling the interstices thereof.

Accordingly, it is an object of my invention to provide an elastic roller, such as an ink roller for printing presses, comprising a metallic central core or shaft, a layer of metal wool secured to the core, and a roller body of elastic, thermoplastic material surrounding the core and the metal wool layer, the thermoplastic material penetrating through and filling the interstices of the metal wool layer to form, as an integral part of the elastic roller body, a metallic fiber reinforced, felt-like layer adjacent to the core and secured thereto.

A further object of my invention is a method of producing such an elastic roller which comprises the steps of preferably helically wrapping the central core of the roller with a layer of metal wool, securing the metal wool layer to the core, and forming the roller body around the wrapped core, for example, by molding or casting methods.

A feature of the elastic rollers according to the present invention resides in their inherent ability to withstand the centrifugal forces produced when such rollers are used as ink rollers in a high speed printing press, and to endure long and severe use without loosening of the elastic, thermoplastic roller body from the central core. Such thermoplastic rollers have the advantages of being insensitive to changes in temperature and humidity. Moreover, they have great dimensional stability and can be produced at relatively low cost with a perfectly smooth external surface and with any desired degree of elasticity which will not vary with age.

Other and further objects will become apparent upon reading the following specification together with the accompanying drawing forming a part hereof.

Referring to the drawing:

Figure 1 is a side view of a roller core wrapped with a layer of metal wool.

Figure 2 is a side view, partially in section, of an ink roller embodying the invention.

Figure 3 is an enlarged sectional view taken along the line 3—3 of Figure 1, looking in the direction of the arrows.

Figure 4 is an enlarged sectional view taken along the line 4—4 of Figure 2, looking in the direction of the arrows.

Referring to Figure 1, the roller comprises a central core, or shaft 11, made of steel, having suitably finished end portions 12 shaped to fit the bearings or other holding means of the printing press in which the ink roller is to be used. The shaft 11 is shown provided with collars 13 having axially projecting lugs 13', the collars 13 serving to prevent axial displacement of the core 11 when mounted in the press, the lugs 13' being provided for engagement with corresponding notches in driving means for rotating the roller at a particular speed with respect to other elements of the printing press.

A layer of steel wool 14 is shown helically wrapped around the central portion of core 11 intermediate the collars 13, and is permanently and fixedly secured thereto by spot-welding at a plurality of points 15. If desired, other fastening means such as screws threaded into core 11, rivets, or any other reliable securing means may be used for holding the steel wool layer 14 in permanent engagement with the core 11.

Referring to Figure 2, an elastic roller body 16 of thermoplastic material is shown concentrically formed about the steel wool wrapped core 11, with the thermoplastic material penetrating through and filling the interstices of the steel wool layer to form, as an integral part of said elastic roller body, a metallic fiber reinforced, felt-like layer adjacent to said core and secured thereto, the external surface of the roller body 16 being smooth, cylindrical and elastic. A roller as shown in Fig. 2 has been found to be eminently suitable for transferring ink from an ink fountain through the usual series of such rollers to an impression surface of the printing press.

Such roller may, according to one aspect of my invention, be produced by a method which involves the steps of wrapping the core 11 helically with the steel wool 14, securing the steel wool wrapping 14 to the core 11 by spot-welding, and thereafter forming the elastic, thermoplastic roller body 16 about the wrapped core, for example, by casting or molding.

As a suitable material for the roller body 16 I may use a Vinylite type thermoplastic such as a polyvinyl compound comprising a di-octyl pthalate or tri-cresyl phosphate plasticizer and a lead stearate, lead phosphate or tribasic lead sulphate stabilizer.

A roller constructed in accordance with my invention will give long and satisfactory service under severe operating conditions such as those encountered in high speed printing presses without the thermoplastic roller body 16 becoming loosened from the wrapped core 11.

I claim:

1. An elastic roller, suitable as an ink roller for a printing press, comprising an elongated, central, metallic core, a layer of metal wool wrapped in metal-to-metal contact around said core and fixedly secured thereto, and a roller body of an elastic, thermoplastic material surrounding the core and including a relatively thick outer layer consisting of thermoplastic material surrounding the metal wool layer and having a smooth, cylindrical, external surface, and integral with said outer layer, a metallic fiber reinforced, inner layer adjacent to said core and secured thereto, said inner layer being formed by thermoplastic material penetrating through and filling the interstices in said metal wool layer.

2. A roller according to claim 1, wherein said core is composed of steel and said wrapped, metal wool layer consists of steel wool spot-welded to said core at a plurality of spaced points.

3. A roller according to claim 1, wherein said metal wool layer is helically wrapped around said core.

4. An elastic roller, suitable as an ink roller for a printing press, comprising an elongated, central, metallic core, a layer of metal wool wrapped in metal-to-metal contact around said core and fixedly secured thereto, and a roller body of an elastic, thermoplastic material comprising a thermoplastic resin, a plasticizer and a stabilizer, said roller body surrounding the core and including a relatively thick outer layer consisting of thermoplastic material surrounding the metal wool layer and having a smooth cylindrical external surface, and, integral with said outer layer, a metallic fiber reinforced, inner layer adjacent to said core and secured thereto, said inner layer being formed by thermoplastic material penetrating through and filling the interstices, in said metal wool layer.

5. An elastic roller, suitable as an ink roller for a printing press, comprising an elongated, central, metallic core, a layer of metal wool wrapped in metal-to-metal contact around said core and fixedly secured thereto, and a roller body of an elastic, thermoplastic polyvinyl composition surrounding the core and including a relatively thick outer layer consisting of thermoplastic material surrounding the metal wool layer and having a smooth, cylindrical external surface and, integral with said outer layer, a metallic fiber reinforced inner layer adjacent to said core and secured thereto, said inner layer being formed by thermoplastic polyvinyl composition penetrating through and filling the interstices in said metal wool layer.

6. An elastic roller comprising an elongated central steel core, a layer of steel wool wrapped helically around the core in metal-to-metal contact and spot welded thereto at a plurality of spaced points, and a roller body of an elastic, thermoplastic material consisting of at least one polyvinyl resin, at least one plasticizer selected from the group consisting of a di-octyl phthalate and tri-cresyl phosphate and at least one stabilizer selected from the group consisting of lead stearate, lead phosphate, and tri-basic lead sulphate, said roller body surrounding the core and including a relatively thick outer layer consisting of thermoplastic material surrounding the metal wool layer and having a smooth, cylindrical external surface and, integral with said outer layer, a metallic fiber reinforced, inner layer adjacent to said core and secured thereto, said inner layer being formed by thermoplastic material penetrating through and filling the interstices in said metal wool layer.

7. A method of producing an elastic roller, suitable as an ink roller for a printing press, said method comprising the steps of wrapping an elongated metallic core with a layer of metal wool; securing said layer to said core, and molding an elastic, thermoplastic roller body about said wrapped core, while causing thermoplastic material to penetrate into and fill the interstices in said metal wool layer so as to form a metallic fiber reinforced inner layer secured to the core and integral with a relatively thick outer layer consisting of thermoplastic material surrounding the metal wool layer and having a smooth cylindrical external surface.

8. The method according to claim 7, wherein said metal wool layer is helically wrapped about said core.

9. A method of producing an elastic roller, suitable as an ink roller for a printing press, said method comprising the steps of wrapping an elongated steel core with a layer of steel wool, spot-welding said layer to said core at a plurality of spaced points, and molding an elastic, thermoplastic roller body about said wrapped core, while causing thermoplastic material to penetrate into and fill the interstices in said metal wool layer so as to form a metallic fiber reinforced inner layer secured to the core and integral with a relatively thick outer layer consisting of thermoplastic material surrounding the metal wool layer and having a smooth cylindrical external surface.

10. A method of producing an elastic roller, suitable as an ink roller for a printing press, said method comprising the steps of wrapping an elongated metallic core, comprising with a layer of metal wool, securing said metal wool layer to said core, and molding about said wrapped core an elastic, thermoplastic roller body of a plasticized polyvinyl compound material containing a stabilizer consisting of a compound of lead, while causing plasticized polyvinyl compound material to penetrate into and fill the interstices in said metal wool layer so as to form a metallic fiber reinforced inner layer secured to the core and integral with a relatively thick outer layer consisting of plasticized polyvinyl compound material surrounding the metal wool layer and having a smooth cylindrical external surface.

11. A method of producing an elastic roller, suitable as an ink roller for a printing press, said method comprising the steps of wrapping an elongated steel core helically with a layer of steel wool spot-welding said steel wool layer to said core at a plurality of spaced points, and molding about said core and steel wool layer an elastic, thermoplastic roller body of a plasticized polyvinyl compound material containing a stabilizer consisting of a compound of lead while causing plasticized polyvinyl compound material to penetrate into and fill the interstices in said metal wool layer so as to form a metallic fiber reinforced inner layer secured to the core and integral with a relatively thick outer layer consisting of plasticized polyvinyl compound material surrounding the metal wool layer and having a smooth cylindrical external surface.

References Cited in the file of this patent

UNITED STATES PATENTS

| Number | Name | Date |
| --- | --- | --- |
| 908,475 | Midgley | Jan. 5, 1909 |
| 1,227,348 | Wale | May 22, 1917 |
| 1,234,004 | Funderburg | July 17, 1917 |
| 2,278,424 | Campbell | Apr. 7, 1942 |
| 2,542,871 | Johnson | Feb. 20, 1951 |

FOREIGN PATENTS

| Number | Country | Date |
| --- | --- | --- |
| 481,327 | Great Britain | Mar. 9, 1938 |